United States Patent
Gomi et al.

(10) Patent No.: US 7,173,546 B2
(45) Date of Patent: Feb. 6, 2007

(54) MAP DISPLAY DEVICE

(75) Inventors: Akihiro Gomi, Okazaki (JP); Masami Mikame, Anjo (JP); Hidenobu Suzuki, Okazaki (JP); Hiromichi Inayoshi, Okazaki (JP)

(73) Assignees: Denso Corporation, Kariya (JP); Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 190 days.

(21) Appl. No.: 10/923,722

(22) Filed: Aug. 24, 2004

(65) Prior Publication Data

US 2005/0057494 A1    Mar. 17, 2005

(30) Foreign Application Priority Data

Aug. 28, 2003   (JP)   ............................. 2003-304497

(51) Int. Cl.
*G08G 1/123* (2006.01)

(52) U.S. Cl. .............................. 340/995.1; 340/995.14; 340/995.15; 340/995.16; 340/995.17; 700/200; 700/208; 700/209

(58) Field of Classification Search ............. 340/995.1, 340/995.14–995.17; 701/200, 208, 209
See application file for complete search history.

(56) References Cited

U.S. PATENT DOCUMENTS

| | | | | |
|---|---|---|---|---|
| 5,757,359 | A | * | 5/1998 | Morimoto et al. .......... 345/156 |
| 6,076,041 | A | * | 6/2000 | Watanabe ................... 701/211 |
| 2001/0044803 | A1 | * | 11/2001 | Szutu ....................... 707/104.1 |
| 2002/0052196 | A1 | * | 5/2002 | Padawer et al. ............ 455/414 |

FOREIGN PATENT DOCUMENTS

JP    A-10-111649    4/1998

* cited by examiner

*Primary Examiner*—Jeffery Hofsass
*Assistant Examiner*—Samuel J. Walk
(74) *Attorney, Agent, or Firm*—Posz Law Group, PLC

(57) ABSTRACT

When a control circuit extracts data of an entity corresponding to a phone number, the control circuit retrieves phone numbers that accord, with respect to lower seven digits of a phone number, with the inputted phone number from among phone numbers included in retrieval data. After the entity having the phone number corresponding to the inputted phone number is extracted, a map including the entity extracted is displayed based on the position information of the entity extracted. Accordingly, even when the area code of the phone number is changed, the map including the corresponding entity can be displayed.

9 Claims, 4 Drawing Sheets

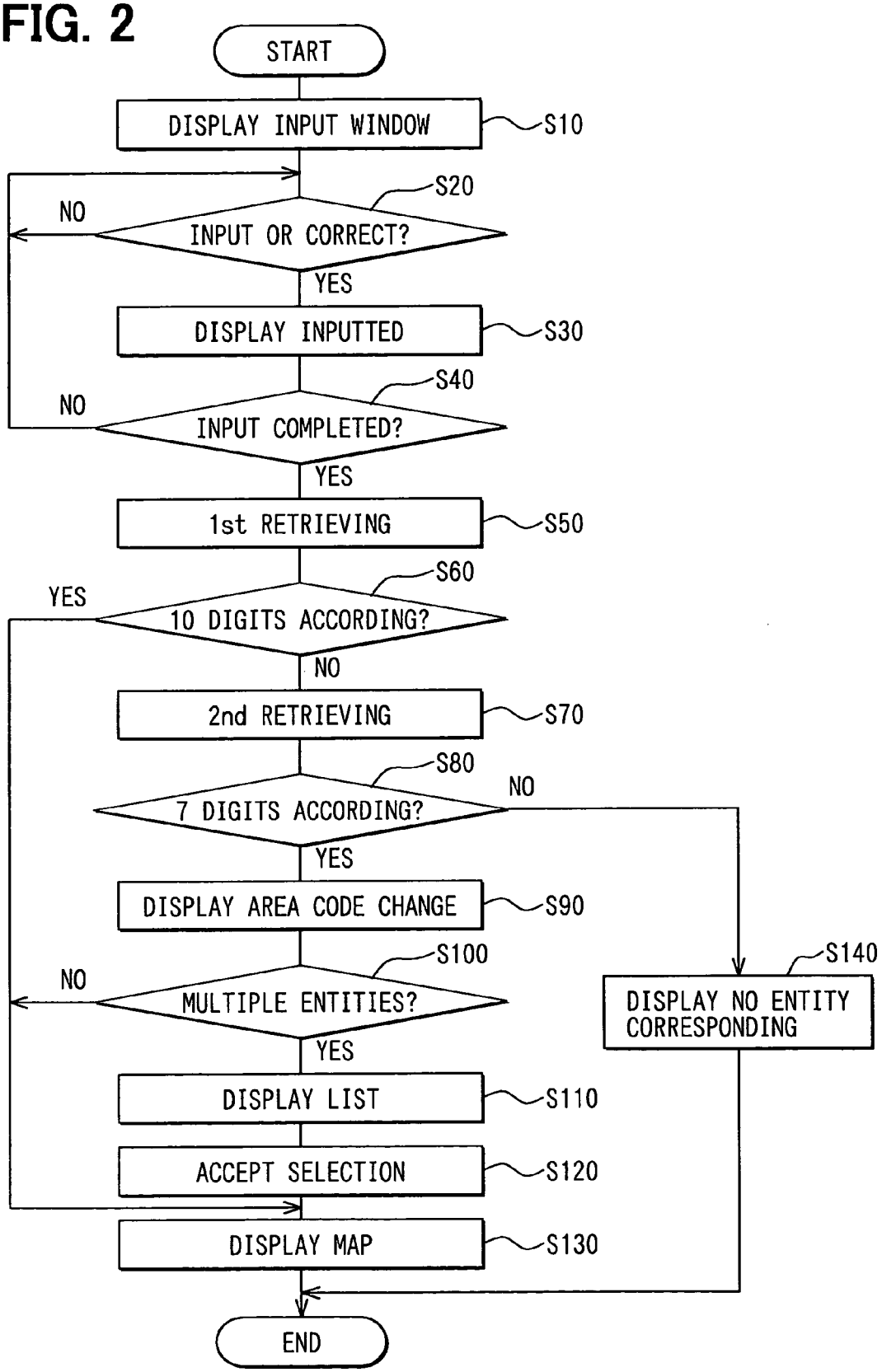

FIG. 4

| NO. | | NAME | POSITION |
|---|---|---|---|
| 111 | 1234567 | AAAA | (XA, YA) |
| 222 | 1234567 | CCCC | (XC, YC) |
| 333 | 1234567 | DDDD | (XD, YD) |
| 333 | 2345678 | EEEE | (XE, YE) |
| 333 | 3456789 | FFFF | (XF, YF) |
| 444 | 1234567 | GGGG | (XG, YG) |
| 555 | 2345678 | HHHH | (XH, YH) |
| ⋮ | | ⋮ | ⋮ |

FIG. 5

| NO. | NAME | SW |
|---|---|---|
| 1 | AAAA | [SELECT] |
| 2 | CCCC | [SELECT] |
| 3 | DDDD | [SELECT] |
| 4 | GGGG | [SELECT] |

MAP DISPLAY DEVICE

CROSS REFERENCE TO RELATED APPLICATIONS

This application is based on and incorporates herein by reference Japanese Patent Application No. 2003-304497 filed on Aug. 28, 2003.

FIELD OF THE INVENTION

The present invention relates to a map display device retrieving and displaying a map including a desired entity using a phone number.

BACKGROUND OF THE INVENTION

Conventionally, a map display device retrieving and displaying a map including a desired entity using a phone number is, for instance, applied to an in-vehicle navigation system for designating a destination. Namely, when a user inputs to the navigation system a phone number corresponding to a given entity that the user hopes to visit, a map surrounding the given entity can be shown on a display of the navigation system. Further, on the display, the given entity is shown in a center with a cursor pointing the given entity. Here, manipulating a destination-setting switch starts route guidance that guides the vehicle to the destination.

The map display device memorizes phone numbers, names, and position information of entities corresponding to the phone numbers. When a phone number is inputted, only a phone number that entirely accords with the inputted phone number can be retrieved. When the phone number that accords with the inputted phone number cannot be found, the device displays a representative point (e.g., a central area) of an area corresponding to an area code of the inputted phone number.

For instance, as occasionally seen in USA, an area code of a phone number is sometimes changed while the digits excluding the area code are not changed. In this case, displaying a map including a relevant entity cannot be achieved.

SUMMARY OF THE INVENTION

The present invention has been made in consideration of the foregoing. It is therefore an object of the present invention to provide a map display device capable of retrieving and displaying a map surrounding a relevant entity by a phone number even when an area code of the phone number is different or changed.

To achieve the above object, a map display device is provided with the following. A map-data storage is included for memorizing map data. A display unit is included for displaying a map based on the map data memorized in the map-data storage. An input unit is included for inputting a phone number. An entity-data storage is included for correlating and memorizing a plurality of phone numbers and entity data including position information of a plurality of entities corresponding to the plurality of phone numbers. An extracting unit is included for extracting, from the entity-data storage, entity data of a certain entity corresponding to a phone number that accords, with respect to a group of lower digits of a phone number, with the inputted phone number. A display control unit is included for causing the display unit to display a map including the certain entity based on the position information of the entity data of the certain entity.

Under the above structure, the extracting unit compares the inputted phone number with the memorized phone numbers with respect to only lower digits of phone number. The lower digits can be designated to exclude an area code that is higher digits of phone number and may be changed. A map including a relevant entity can be thereby displayed even when the phone number of the relevant entity is changed or different.

BRIEF DESCRIPTION OF THE DRAWINGS

The above and other objects, features, and advantages of the present invention will become more apparent from the following detailed description made with reference to the accompanying drawings. In the drawings:

FIG. 2 is a flow chart diagram explaining a process of retrieving and displaying a map including a desired entity using a phone number according to the first embodiment;

FIG. 4 is a table showing exemplified retrieval data of phone numbers, entity names, and position information;

FIG. 5 is a view of an exemplified window for displaying a list of entity names extracted by phone-number retrieving.

DETAILED DESCRIPTION OF THE PREFERRED EMBODIMENTS (First Embodiment)

The following describes the map display device according to a first embodiment of the present invention with reference to the accompanying drawings. The description to follow covers an example of applying the present invention to a navigation device mounted on a vehicle.

Figure 1:
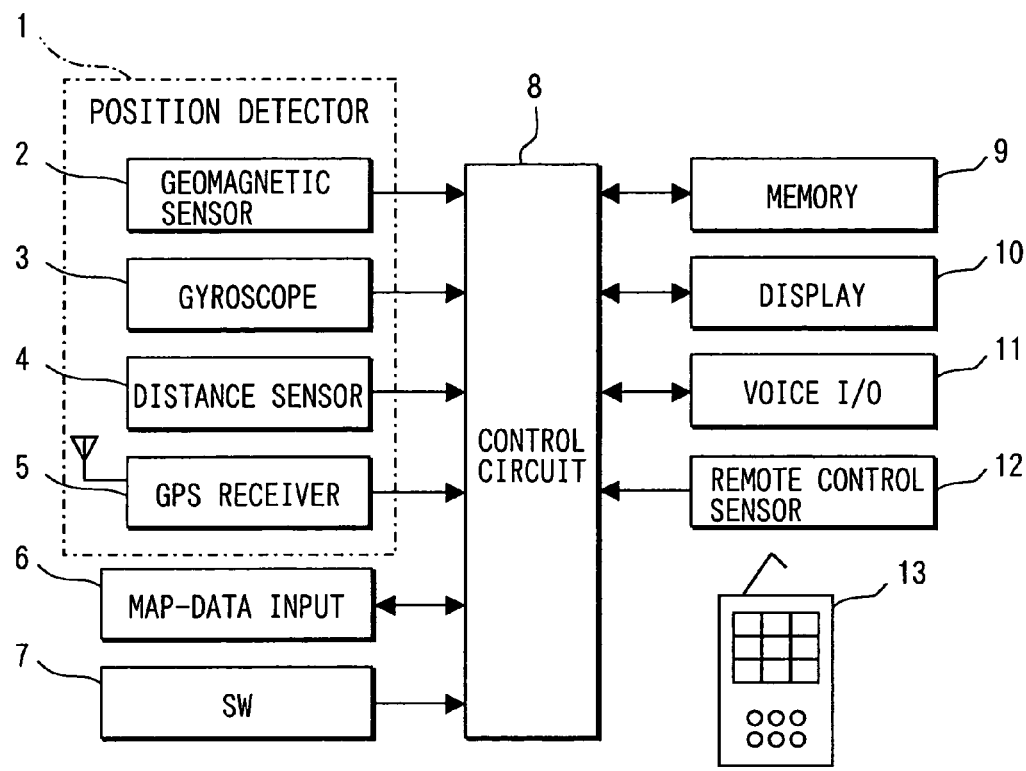
FIG. 1 is a block diagram showing a general structure of a navigation device according to a first embodiment of the present invention.

FIG. 1 is a block diagram showing a general structure of the navigation device according to the first embodiment. As shown in FIG. 1, a navigation device includes a position detector 1, a map-data input device 6, an operation switch (SW) group 7, an external memory 9, a display unit 10, a voice input/output (I/O) unit 11, a remote control sensor 12, and a control circuit 8 connected to these parts.

The control circuit 8 is configured as an ordinary computer. The control circuit 8 contains known components such as a CPU, ROM, RAM, I/O, and a bus line connecting these components. The ROM stores a program executed by the control circuit 8. The CPU and the like perform specified operations in accordance with the stored program. The program can be obtained externally via the external memory 9.

The position detector 1 has known parts such as a geomagnetic sensor 2, a gyroscope 3, a distance sensor 4, and a GPS (Global Positioning System) receiver 5 to detect vehicle positions based on radio waves from satellites. These parts cause their own errors due to different characteristics and are therefore configured to be used by a plurality of sensors that complement each other. Depending on accuracies of the sensors, some of the above-mentioned parts may constitute the position detector 1.

The map-data input device 6 is used for inputting, to the control circuit 8, map data including: road map data and landmark data for drawing a road map; and retrieval data for retrieving various entities using phone numbers.

In the map-data input device 6, these databases are generally stored (or memorized) in read-only storage media such as CD-ROM and DVD-ROM from their data volumes. The databases may be stored in writable storage media such as a memory card, a hard disk, and the like.

The structure of the retrieval data will be explained below. The retrieval data includes phone numbers and entity data relating to entities that are correlated with the phone numbers for retrieving the entities using the phone numbers. The entity data includes at least names and coordinates information as position information. The entity data can further include detailed information of the entities such as addresses and opening hours.

The operation switch group 7 uses, for example, a touch switch integrated with the display unit 10, a mechanical switch, and the like. The operation switch group 7 is used for various input operations such as scrolling a map displayed on a screen of the display unit 10, entering characters and digits, selecting keys, and the like.

The external memory 9 uses a storage medium such as a memory card, hard disk, and the like. The external memory 9 is used for storing test data, image data, audio data or the like.

The display unit 10 is composed of a liquid crystal display, for example. The screen of the display unit 10 can display a vehicle position mark and a map around the vehicle through the processing of the control circuit 8. The vehicle position mark corresponds to the vehicle's current position input from the position detector 1. The map is generated from the map data inputted from the map-data input device 6. Further, when a desired entity is retrieved using a phone number, a phone-number input window is shown; when multiple candidate entities are then extracted from the phone numbers, these entities are shown as a list.

The voice input/output unit 11 includes an input unit and an output unit. The input unit recognizes the contents of user's narration and is used for various inputs to the navigation device. The output unit includes a speaker, an audio amplifier, and the like, and is used for voice guidance when a destination is set and a route to the destination is computed.

Further, the navigation device of this embodiment includes a remote control sensor 12 receiving operating signals from a remote control terminal 13 via wireless communications. By manipulating the remote control terminal 13, a map displayed can be scrolled in an arbitrary direction or various operations such as input of a phone number of a desired entity can be performed. Further, when a destination is set, the control circuit 8 automatically retrieves an appropriate route to the destination from the current position of the relevant vehicle (or from a position designated by the user) to compute a guidance route for displaying it on the display unit 10.

The processing of retrieving and displaying a map including a desired entity using a phone number (map displaying processing) is a feature of this embodiment and will be explained below with reference to FIG. 2. This map displaying processing is used not only for designating a desired entity as a destination, but also for displaying a map including a desired entity so as to confirm roads surrounding the entity.

Figure 3:
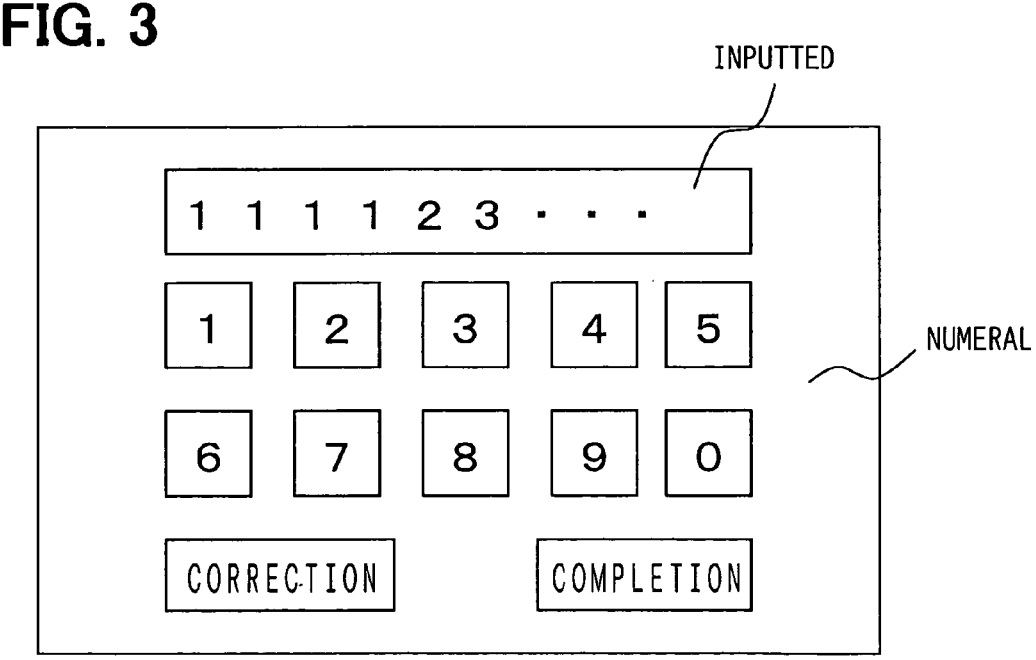
FIG. 3 is a view of an exemplified phone-number input window.

The flow chart shown in FIG. 2 is started, for instance, when switching manipulation or voice input is executed for commanding entity retrieving using phone numbers. At Step S10, the processing of displaying a phone-number input window is executed. An example of the phone-number input window is shown in FIG. 3. As shown in FIG. 3, the window includes numeral keys for inputting phone numbers every digit, a displaying portion for displaying an inputted digit, and function keys such as a correction key for correcting the inputted number and a completion key for completing input. The completion key can be omitted when the completion of input is determined after a phone number having the given number of digits is inputted. The function keys can also include a stop key for stopping the input of phone number.

At Step S20, it is determined to be "YES" when a digit is inputted through a touch switch or remote control sensor 12. The process thereby advances to Step S30, where the inputted digit is memorized and displayed on the displaying portion. When the correction key is manipulated, it is determined to be "YES" at Step S20; then, at Step S30, the latest digit (most previously inputted digit) is erased from among the digits memorized and displayed.

At Step S40, it is determined whether an input of phone number is completed based on the completion key being manipulated or not-manipulated or the number of digits inputted. When it is determined that the input of phone number is not completed, the process returns to Step S20 where the digit input is continued; when it is determined that the input is completed, the process advances to Step S50 where the first phone-number retrieving processing is executed. Here, the phone numbers included in the above-mentioned retrieval data is searched for the phone number according with the inputted phone number (10 digits). When the phone number according with the inputted is found, it is determined to be "YES" at Step S60, advancing the process to Step S130. By contrast, when the phone number according with the inputted is not found, it is determined to be "NO" at Step S60, advancing the process to Step S70.

At Step S70, the second phone-number retrieving processing is executed. Here, a phone number to be retrieved from the retrieval data has its lower seven digits (group of lower seven digits) according with the lower seven digits within the inputted ten digit phone number, i.e., a portion excluding a long distance number (3 digit area code). Namely, as occasionally seen in USA, there is a case where an area code of a phone number is only changed, so that the retrieving processing is executed only for other than the area code. Using the unchanged lower seven digits enables retrieving a phone number corresponding to the inputted phone number even when the area code is changed in the inputted phone number. When a phone number according with the inputted phone number in the lower seven digits is found, it is determined to be "YES" at Step S80, advancing the process to Step S90. At Step S90, a notice indicating the possibility of the area code being changed is displayed, advancing the process to Step S100. By contrast, when a phone number according to the inputted phone number in the lower seven digits is not found, it is determined to be "NO" at Step S80, advancing the process to Step S140. At Step S140, a notice is displayed that indicates the entity corresponding to the inputted phone number is not found since the corresponding phone number is not found in the retrieval data using the first and second phone-number retrieving processings. The process is then terminated.

At Step S100, it is determined whether multiple entities (or a group of entities) having a phone number according in its lower seven digits exist or not. That is, retrieving the phone number according with the inputted number in the lower seven digits sometimes results in extraction of the multiple phone numbers or the multiple entities. In this case, processing from Step S110 is executed for designating which entity to be displayed from among the multiple entities. By contrast, when the only one entity is found as an entity according with the inputted number in the lower seven digits, the process advances to Step S130.

At Step S110, the processing is executed for displaying an entity-name list where names of the entities having phone numbers according with the inputted number in the lower seven digits are included. For instance, it is supposed that retrieval data includes data shown in FIG. 4 and "0001234567" is inputted as a number to be retrieved. Here, this inputted number does not accord entirely with any numbers included in the retrieval data, so that "1234567" of the lower seven digits, excluding the area code, of the inputted number is then to be retrieved. In this case, the lower seven digits of "1234567" is possessed by the entities of "AAAA," "CCCC," "DDDD," and "GGGG." Thus, the four entities are extracted through the above-mentioned second phone-number retrieving processing, so that a list is displayed such that the names and accompanying numbers of the extracted entities are listed as shown in FIG. 5. This list displaying window further includes selection switches corresponding to the respective entities. A specific entity is selected from among the four entities included in the list, by manipulating the corresponding switch of the selection switches or inputting the number or name of the specific entity by voice. At Step S120 in the flow chart, an input is accepted for selecting a specific entity from among the entities in the list. When the specific entity is selected, the process advances to Step S130.

At Step S130, processing of displaying a map including the entity is executed. The entity is selected at Step S120 from among the multiple extracted entities, or determined as one entity to be retrieved at Step S60 by the first phone-number retrieving processing or at Step S100 by the second phone-number retrieving processing. The retrieval data includes coordinates as the position information of entity data, so that map data necessary is read out from the map-data input device 6 after determining the map region so that the entity to be displayed is located around a center of the displayed map. Based on the map data read out, the map including the relevant entity is displayed in the display unit 10. Here, the name or address of the entity can be also displayed.

As explained above, according to the vehicular navigation device of this embodiment, comparison between the inputted phone number and memorized phone numbers is performed with respect to only the lower seven digits of the phone number. This enables extraction of data of an entity corresponding to the inputted number using the lower seven digits excluding the area code even if the area code is changed. Further, based on the position information of the entity extracted, the map including the relevant entity can be displayed. Here, compared digits can be the smaller number of digits of the phone number, instead of the lower seven digits. Furthermore, when the area code is changed only in a portion of the higher digits, comparison can be performed with respect to digits including the unchanged lower digit or digits of the area code.

Further, in this embodiment, when the multiple phone numbers according with the inputted phone number in the digits excluding the area code are retrieved, the entity names corresponding to the retrieved phone numbers are displayed as a list so that a user can select which entity to be displayed on the map. Therefore, the map including the entity desired by the user can be securely displayed.

Furthermore, in this embodiment, in the first place, the first phone-number retrieving processing is performed so that the phone number according with the entire inputted phone number is retrieved from among the phone numbers included in the retrieval data; when the phone number cannot be found in the first phone-number retrieving processing, the second phone-number retrieving processing is performed so that the phone number according, with respect to the lower seven digits, with the inputted phone number is retrieved. Thus, when the phone number according with the entire inputted phone number is memorized in the retrieval data, the first phone-number retrieving processing where the phone number according with the entire inputted phone number is retrieved in the first place removes unnecessary manipulation from a user to smoothly display the relevant map. By contrast, when the phone number according with the entire inputted phone number is not memorized in the retrieval data, the area code is possibly changed. Only in this case, the second phone-number retrieving processing where the phone number according, with respect to the lower seven digits, with the inputted phone number is retrieved. This enables the phone-number retrieving using a part of the inputted phone number to be performed at appropriate timing.

Further, the first and second phone-number retrieving can be simultaneously executed. Thereafter, whether the phone number according with the entire inputted phone number is retrieved, and whether the phone number according, with respect to the lower seven digits, with the inputted phone number can be sequentially determined.

(Second Embodiment)

The following describes the map display device according to a second embodiment of the present invention. The description to follow also covers an example of applying the present invention to a navigation device mounted on a vehicle. The structure of the navigation device according to the second embodiment is the same as that of the first embodiment, so that explanation will be omitted. In this embodiment, with respect to the lower seven digits, each time a digit is inputted, phone numbers according with the inputted digits are narrowed down; further, the digit that is subsequently able to be inputted is set from among the phone numbers narrowed down. This eliminates displaying a notice indicating no corresponding entity is retrieved after the entire digits of the phone number are inputted, further shortening the processing for displaying the map including the corresponding entity, displaying a list of the multiple entities, etc.

Figure 6:
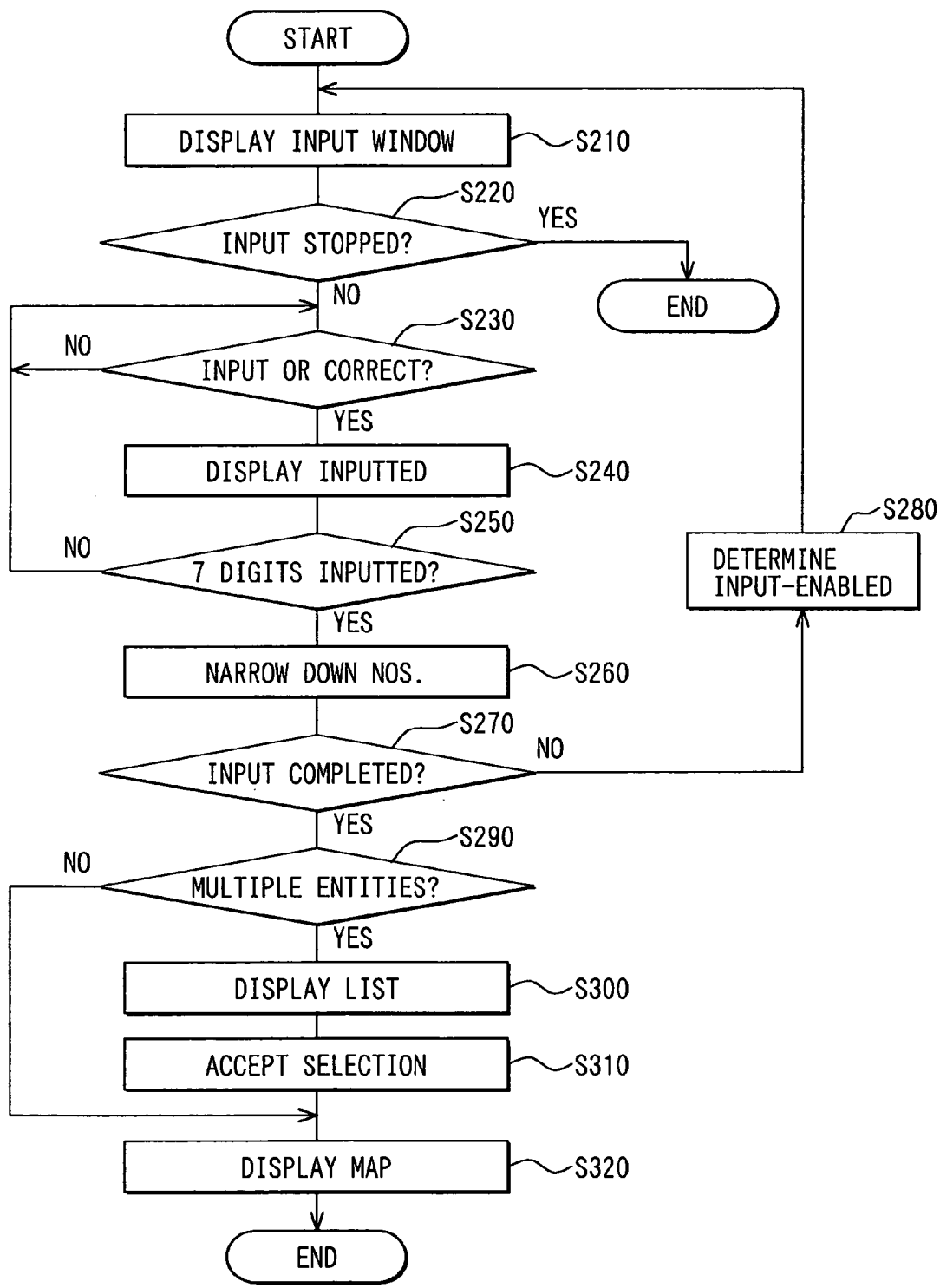
FIG. 6 is a flow chart diagram explaining a process of retrieving and displaying a map including a desired entity using a phone number according to a second embodiment of the present invention.

The processing of retrieving and displaying the map including a desired entity will be explained below with reference to FIG. 6. At Step S210, the processing of displaying a phone-number input window is executed. This processing is basically similar with that of the first embodiment. However, in this embodiment, although the detail will be described later, when a digit that is subsequently able to be inputted (hereinafter, referred to as "input-enabled digit") is designated at Step S280 by considering the phone numbers narrowed down, the input-enabled digit(s) is distinguished from the not input-enabled digit(s) while being displayed. In detail, the digit and displaying line surrounding the digit are increased in thickness or differentiated in color; otherwise, the inside of the displaying line surrounding is colored in a different color. Further, in the input window, input is allowed only for the input-enable digit, not allowed for the not input-enabled digit.

At Step S210, for instance, when the digit corresponding to a phone number that the user intends to input is displayed as the not input-enabled digit, it is determined whether the user commands stop of the input or not. When it is determined that the user commands the stop of the input, the process of this flow chart is terminated; otherwise, when it is determined that the user does not command, the process to Step S230.

Steps S230, S240 are the same as Steps S20, S30 in FIG. 2, respectively; when the digit is inputted or corrected, the digit is memorized or erased, respectively.

At Step S250, it is determined whether any one of the lower seven digits excluding the area code is inputted. When it is determined to be "NO," the process returns to Step S230; when it is determined to be "YES," the process advances to Step S260, where the phone-number narrowing down retrieving processing is executed. Here, each time any one of the lower seven digits is inputted, the phone number according with digits so far inputted with respect to the lower seven digits is extracted from the phone numbers included in the retrieval data. Further, as the number of digits inputted increases, the phone numbers are furthermore narrowed down.

At Step S270, it is determined whether an input of phone number is completed. When it is determined that the input of phone number is not completed, the process advances to Step S280; when it is determined that the input is completed, the process advances to Step S290.

At Step S280, by referring to the phone numbers narrowed down, the input-enabled digit is determined so as to further narrow down the phone numbers. Namely, digits to be subsequently inputted in the phone numbers already narrowed down are determined as the input-enabled digits, so that, as explained above, at Step S210 the input-enabled digits can be displayed differently from the not input-enabled digits.

Processing from Steps S290 to S320 is the same as that from S100 to S130, so that explanation is omitted.

Thus, the navigation device according to the second embodiment prevents a notice indicating that no entity having the phone number according with the inputted phone number with respect to the lower seven digits is retrieved after the phone number is completely inputted. In other words, during inputting the phone number, the digit input is prohibited, so that the user can omit an additional and useless manipulation. Further, each time a digit is inputted, the corresponding phone numbers are narrowed down, which shortens processing for extracting the entities having the relevant phone numbers when the phone numbers having the lower seven digits according with those of the inputted corresponding digits exist.

Furthermore, the number of entities having the phone number according with the inputted phone number, with respect to the lower seven digits, can be displayed. When the number of entities is decreased even before the input is not completed, the user manipulates the input completion to display a list of names of the relevant candidate entities. The user can thereby omit the subsequent input manipulation.

It will be obvious to those skilled in the art that various changes may be made in the above-described embodiments of the present invention. However, the scope of the present invention should be determined by the following claims.

What is claimed is:

1. A map display device comprising:
   a map-data storage that memorizes map data;
   a display unit that displays a map based on the map data memorized in the map-data storage;
   an input unit for inputting a phone number having a string of digits, which is grouped into a group of higher digits and a group of lower digits in order;
   an entity-data storage that correlates and memorizes a plurality of phone numbers and entity data including position information of a plurality of entities corresponding to the plurality of phone numbers;
   an extracting unit that extracts, from the entity-data storage, entity data of a certain entity corresponding to a phone number having a group of lower digits that accords with a group of lower digits of the inputted phone number; and
   a display control unit that causes the display unit to display a map including the certain entity based on the position information of the entity data of the certain entity.

2. The map display device of claim 1,
   wherein the entity data further includes name information of the plurality of entities,
   wherein, when the extracting unit extracts, from the entity-data storage, entity data of a group of entities corresponding to phone numbers that accord, with respect to the group of lower digits, with the inputted phone number, wherein the group of entities are included in the plurality of entities,
   the display control unit causes the display unit to display a list of names of the group of entities based on the name information of the group of entities, and
   wherein, when a specific entity is selected from among the group of entities included in the list displayed,
   the display control unit causes the display unit to display a map including the specific entity.

3. The map display device of claim 1,
   wherein, when the phone number that the certain entity corresponds to is only one phone number that accords, with respect to the group of lower digits, with the inputted phone number,
   the display control instantly causes the display unit to display a map including the certain entity.

4. The map display device of claim 1,
   wherein the extracting unit uses, as the group of lower digits, digits excluding an area code from the inputted phone number.

5. The map display device of claim 1, further comprising:
   an input control unit that allows a subsequent input of a digit through the input unit,
   wherein, each time a digit of a phone number is inputted, the extracting unit narrows down phone numbers that accord, with respect to an inputted portion of the group of lower digits, with an inputted portion of the phone number, and
   wherein the input control unit allows the subsequent input of a digit that is included as a subsequently inputted digit in the phone numbers narrowed down.

6. The map display device of claim 1,
   wherein the extracting unit searches the entity-data storage for entity data of a given entity corresponding to a phone number that entirely accords with the inputted phone number, and
   wherein, when the entity data of the given entity is not found,
   the extracting unit extracts, from the entity-data storage, entity data of an entity corresponding to a phone number having a group of lower digits that accords with a group of lower digits of the inputted phone number.

7. A map display device of comprising:
a map-data storage that memorizes map data;
a display unit that displays a map based on the map data memorized in the map-data storage;
an input unit for inputting a phone number;
an entity-data storage that correlates and memorizes a plurality of phone numbers and entity data including position information of a plurality of entities corresponding to the plurality of phone numbers;
an extracting unit that extracts, from the entity-data storage, entity data of a certain entity corresponding to a phone number that accords, with respect to a group of lower digits of a phone number, with the inputted phone number; and
a display control unit that causes the display unit to display a map including the certain entity based on the position information of the entity data of the certain entity,
wherein the extracting unit searches the entity-data storage for entity data of a given entity corresponding to a phone number that entirely accords with the inputted phone number, and
wherein, when the entity data of the given entity is not found,
the extracting unit extracts, from the entity-data storage, entity data of a entity corresponding to a phone number that most closely accords with the inputted phone number.

8. An entity retrieving method that uses a phone number and is provided in a map display device that includes:
a map-data storage that memorizes map data;
a display unit that displays a map based on the map data memorized in the map-data storage;
an input unit for inputting a phone number; and
an entity-data storage that correlates and memorizes a plurality of phone numbers and entity data including position information of a plurality of entities corresponding to the plurality of phone numbers, each phone number having a string of digits grouped into a group of higher digits and a group of lower digits in order,
the method comprising steps of:
extracting, from the entity-data storage, entity data of a certain entity corresponding to a phone number that accords, with respect to a group of lower digits of a phone number, with the inputted phone number; and
causing the display unit to display a map including the certain entity based on the position information of the entity data of the certain entity.

9. The entity retrieving method of claim 8,
wherein the entity data further includes name information of the plurality of entities, and
wherein, when entity data of a group of entities corresponding to phone numbers that accord, with respect to the group of lower digits, with the inputted phone number is extracted from the entity-data storage, wherein the group of entities are included in the plurality of entities,
the entity retrieving method further comprising steps:
causing the display unit to display a list of names of the group of entities based on the name information of the group of entities, and
causing the display unit to display a map including a specific entity when the specific entity is selected from among the group of entities included in the list displayed.

* * * * *